United States Patent Office 3,449,894
Patented June 17, 1969

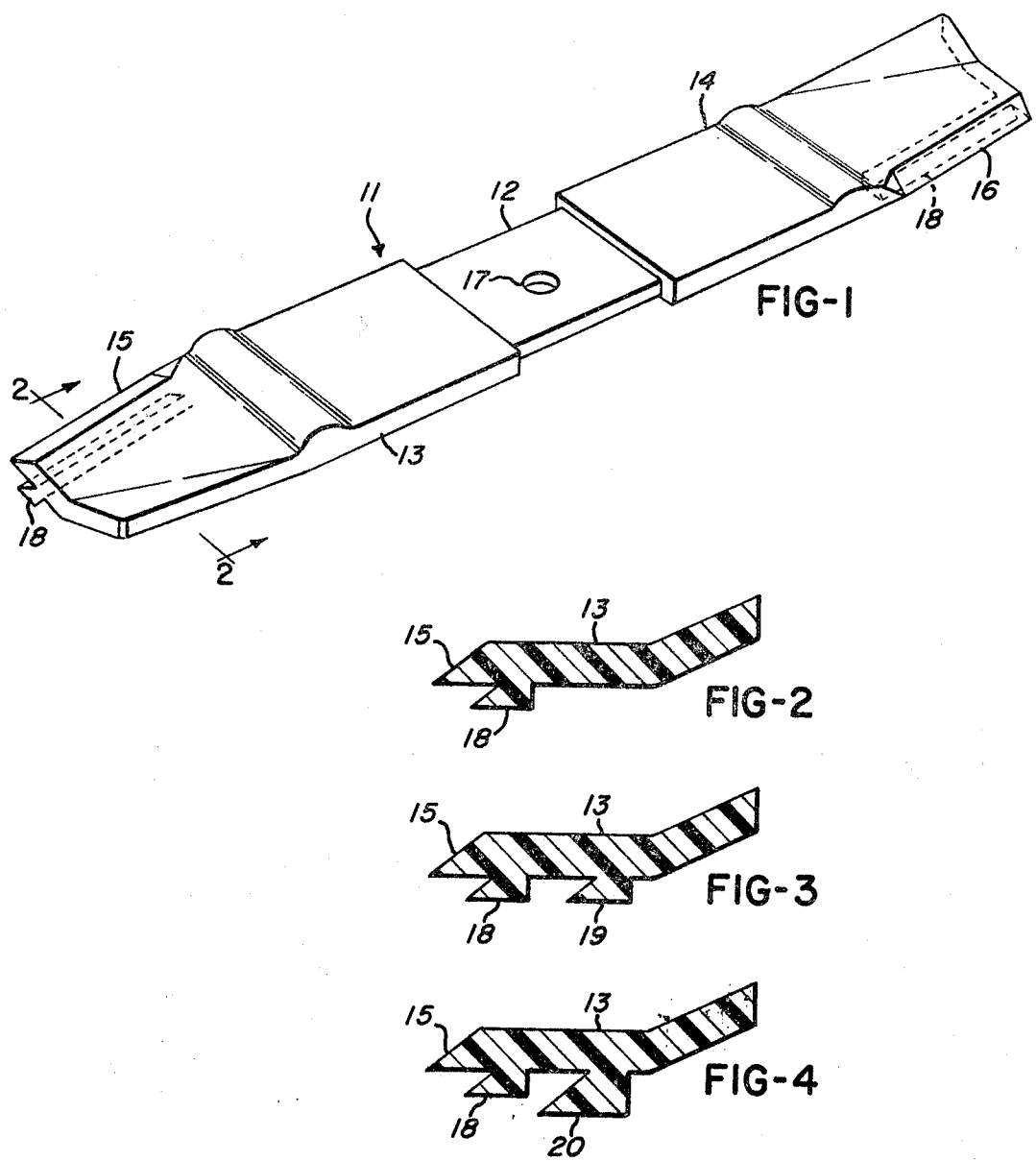

---

3,449,894
MULTIPLE EDGE MOWER BLADE
Abraham L. Freedlander, Dayton, Ohio, and Robert E. Matthews and Wayne C. Garrett, Waynesville, N.C., assignors to Dayco Corporation, Dayton, Ohio, a corporation of Delaware
Filed Feb. 19, 1968, Ser. No. 706,362
Int. Cl. A01d 55/18
U.S. Cl. 56—295        4 Claims

ABSTRACT OF THE DISCLOSURE

A flexible mower blade primarily formed of an elastomeric material and having a rigid metal or plastic central mounting portion within the blade for mounting on the lawn mower shaft. The blade has cutting edges at the tips, and extra cutting members mounted on the lower surface of the blade below the regular cutting edges.

---

Conventional lawn mowers used by the average homeowner are usually rotary and are gasoline or electric motor operated. This type of mower is also popular for industrial mowing operations. The term "rotary" refers to a mower in which the shaft extends vertically downward from the housing and upon which the blade is mounted so that it rotates in a plane parallel to the ground. This type of mower is popular because it is simple to operate, inexpensive to build, and performs a highly satisfactory job of cutting grass and weeds. Unfortunately, however, the extremely high speeds at which such mowers operate, up to 3600 r.p.m., cause the blades to create extremely high hazards. For example, there has been many cases known where the operator's foot has accidentally slipped under the housing and has been struck by the rotating blade, causing serious injury to, and even amputation of, the foot. In addition, the conventional metal cutting blade may strike large rocks, posts, or other objects in the lawn, and the sudden shock may cause the blade to break, hurling pieces of metal at tremendous speeds to cause injury to the operator or to the persons close by. In the case of loose stones and other obstructions, these objects are also often struck by a rigid metal blade and caused to be thrown great distances to create damage to persons or property. A further disadvantage of the conventional metal blade used in the rotary mower is that it becomes dull very quickly and must be resharpened for proper efficiency.

The present invention is designed to overcome the many disadvantages recited above, while at the same time retaining the advantages of the rotary type blade. The invention utilizes a blade having arms somewhat similar to those of a metal blade, but made of an elastomeric material that is sufficiently rigid to cut grass as efficiently as a metal blade, and yet sufficiently flexible to permit the blade to flex when striking an object such as a shoe. This flexing actions permits the blade to ride over the objects and thus avoid serious damage to the foot. This flexing is also useful if an immovable object, such as a large rock or post, is encountered, since the blade is still permitted to flex and ride over this object; at the same time, the blade has a certain amount of inherent elasticity that tends to cushion the initial shock and prevent the blade from breaking. In the case of small rocks, etc. the flexing action will somewhat cushion the initial impact and reduce the amount of speed at which these small objects are hurled. The novel blade also has the property of being able to flex repeatedly without destroying any of its properties, and also retains a cutting edge a remarkably long time. The material utilized also has the properties of elongating only a very small amount during operation and yet has sufficient elastic memory to return to its original size despite many hours of use. Despite the fact that it is elastomeric, the blade itself does not get softer during operation, but retains its initial properties that provide an excellent compromise between sufficient regidity for cutting and sufficient flexibility for safety. The blade is also extremely simple to manufacture and very low in cost.

In our copending application Serial No. 759,825, filed on Sept. 11, 1968, which is a continuation of Ser. No. 625,802, filed Mar. 24, 1967, we have described a blade made primarily of a urethane elastomer, but having a rigid central mounting plate embeded within the elastomer for mounting the blade upon the drive shaft. The present invention represents an improved form of blade in which extra cutting edges are mounted below the regular cutting edges. The multiple edge arrangement has several functions. First of all, it provides an added mulching effect on the grass or leaves as they are cut. Secondly, a cleaner cut results because the extra cutting edge clips the blades of grass which may have been missed by the first blade. Occassionally in conventional mowers, some of the blades of grass are not standing straight and the blade passes over them. In the present blade the blades of grass may be just short enough to be missed by the regular edge, but caught by the lower one.

The specific embodiments of the invention are described in the following specification and claims, and illustrated in the drawings, in which:

FIGURE 1 is a perspective view of a novel blade.

FIGURE 2 is a cross-sectional view of the blade taken along line 2—2 of FIGURE 1.

FIGURES 3 and 4 are views similar to FIGURE 2 illustrating modified forms of the blade.

Referring to the drawings, FIGURE 1 illustrates a lawn mower blade 11 which is generally flat and rectangular and has outwardly extending arms 13 and 14 having integral cutting edges 15 and 16 at the leading edges thereof. These arms are made of an elastomer, and preferably of a urethane elastomer such as more fully described in our copending application referred to above, of the type which may be molded or cast and formulated from a polyster or polyether based isocyanate terminated prepolymer. Mounted wthin the central portion of the blade is a rigid central mounting plate 12 which may be made of a metal or of a rigid plastic material such as nylon, polycarbonate, polystryrene, polyacetal, or the like. This plate 12 is at least partially embedded within the arms and forms a central mounting member, the central section of the plate being exposed. An aperture 17 in the center of the plate permits mounting on the shaft of a lawn mower and the use of the appropriate hardware for mounting. The aperture 17 may be made with a diameter which is required to fit the smallest of the lawn mowers on the market, so that it is only necessary for the user to drill this hole out to a larger diameter if required for his particular mower.

The cutting edges 15 and 16, which correspond to the leading edges of the blade, are in the shape of beveled portions extending inwardly toward the center from the outer tips of the blade for about three to four inches, since all the cutting is performed in this region. Normally, these edges do a satisfactory job of cutting. In the present invention, as shown in FIGURES 1 and 2, extra cutting members 18 are coextensive with cutting edges 15 and 16, and extend below the plane of the lower surface of the arm, forming cutting edges just below the cutting edges 15 and 16. These members are shaped similarly to the main cutting edges, extend approximately parallel thereto, and run from the outer tips of the blade inwardly toward the center for the same distance as the main cutting edges, and are located in a direction away from the leading edges of the blade.

A modified form of the invention is illustrated in FIGURE 3, in which two extra cutting members 18 and 19 are utilized instead of one. The member 19 is shaped similarly to member 18, and both members extend parallel to and for the same distance as the cutting edges 15 and 16. Member 19 is just behind member 18; that is, in a direction further away from the leading edge, and the lower surface of member 19 is on the same plane as member 18.

A further modification is illustrated in FIGURE 4, in which two extra cutting members 18 and 20 are utilized. The member 20 is shaped similarly to member 18, and is also located behind member 18. However, unlike the modification of FIGURE 3, the member 20 extends below the plane of the member 18 so that there are in effect three cutting planes.

In the operation of a mower utilizing the novel blade, the blade will normally be set to mow at two inches, which is the height of the edges 15 and 16 above the ground. The extra cutting members 18 and 19 are about ¼ inch lower than this. In the FIGURE 4 configuration, member 20 is another ¼ inch lower. In addition to the extra cutting effect, the blade has been found to be effective for mulching leaves or as a snow blower, due primarily to the extra air turbulence.

As shown in the drawings, the extra members are parallel to the cutting edge, but may be at an angle thereto. In fact, if the blade is to be resharpened frequently, the extra members may be angled so that as the blade is sharpened toward the tip, the extra members are not cut off.

Other modifications are contemplated as being within the scope of the invention.

We claim:
1. In a lawn mower having a rotatable shaft and a cutting blade mounted thereon, said blade comprising outwardly extending flexible elastomeric arms and a rigid central mounting plate extending outwardly thereinto, each of said arms having a first cutting edge integral therewith and located at the leading edge thereof and a second cutting edge coextensive with said first cutting edge and extending below the plane of the lower surface of said arm, said second cutting edge being located in a direction away from said leading edge.

2. The blade of claim 1 including a third cutting edge located in a direction further from said leading edge than said second cutting edge.

3. The blade of claim 2 in which said third cutting edge is in the same plane as said second cutting edge.

4. The blade of claim 2 in which said third cutting edge extends below the plane of said second cutting edge.

References Cited

UNITED STATES PATENTS

| | | | |
|---|---|---|---|
| 2,473,665 | 6/1949 | Van Nort | 170—159 |
| 2,697,322 | 12/1954 | Watrous | 56—25.4 |
| 2,924,059 | 2/1960 | Beeston | 56—295 |
| 3,093,952 | 6/1963 | Bonser | 56—255 |
| 3,320,732 | 5/1967 | Kirk | 56—295 |
| 3,340,682 | 12/1967 | Ely | 56—295 |

ANTONIO F. GUIDA, *Primary Examiner.*

PASQUALE A. RAZZANO, *Assistant Examiner.*